United States Patent
Lian et al.

(10) Patent No.: US 11,273,699 B2
(45) Date of Patent: *Mar. 15, 2022

(54) POWER-DRIVEN SYSTEM FOR VEHICLE AND VEHICLE

(71) Applicant: BYD COMPANY LIMITED, Shenzhen (CN)

(72) Inventors: Yubo Lian, Shenzhen (CN); Heping Ling, Shenzhen (CN); Zhen Zhai, Shenzhen (CN); Fei Wu, Shenzhen (CN); Youbin Xu, Shenzhen (CN)

(73) Assignee: BYD Company Limited, Guangdong (CN)

( * ) Notice: Subject to any disclaimer, the term of this patent is extended or adjusted under 35 U.S.C. 154(b) by 285 days.

This patent is subject to a terminal disclaimer.

(21) Appl. No.: 16/335,756

(22) PCT Filed: Aug. 3, 2017

(86) PCT No.: PCT/CN2017/095899
§ 371 (c)(1),
(2) Date: Mar. 22, 2019

(87) PCT Pub. No.: WO2018/059118
PCT Pub. Date: Apr. 5, 2018

(65) Prior Publication Data
US 2020/0016970 A1  Jan. 16, 2020

(30) Foreign Application Priority Data

Sep. 28, 2016 (CN) .......................... 201610858511.6

(51) Int. Cl.
*B60K 6/442* (2007.10)
*B60K 6/26* (2007.10)
(Continued)

(52) U.S. Cl.
CPC ................ *B60K 6/442* (2013.01); *B60K 6/26* (2013.01); *B60K 6/36* (2013.01); *B60K 6/38* (2013.01);
(Continued)

(58) Field of Classification Search
CPC . B60K 6/442; B60K 6/26; B60K 6/36; B60K 6/38; B60K 6/547; B60K 6/44;
(Continued)

(56) References Cited

U.S. PATENT DOCUMENTS 6,269,895 B1 * 8/2001 Tanuguchi ............ B60W 10/08
180/65.25
6,524,217 B1 * 2/2003 Murakami ............. B60K 6/365
477/5
(Continued)

FOREIGN PATENT DOCUMENTS

| CN | 102107604 A | 6/2011 |
|----|-------------|--------|
| CN | 102114770 A | 7/2011 |

(Continued)

OTHER PUBLICATIONS

The World Intellectual Property Organization (WIPO) International Search Report for PCT/CN2017/095899 dated Nov. 1, 2017 6 Pages.

*Primary Examiner* — Paul N Dickson
*Assistant Examiner* — Timothy Wilhelm
(74) *Attorney, Agent, or Firm* — Anova Law Group, PLLC

(57) ABSTRACT

The present disclosure provides a power-drive system for a vehicle and a vehicle. The power-drive system comprises: an engine; a plurality of input shafts; a plurality of output shafts, the plurality of output shafts linking with a differential of the vehicle; a first clutch device, arranged between the engine and the plurality of input shafts, so that the engine
(Continued)

selectively engages with at least one of the plurality of input shafts; a first motor generator, configured to link with the differential of the vehicle; and a second motor generator, wherein the second motor generator and the engine are located on an input side of the first clutch device, the plurality of input shafts is located on an output side of the first clutch device, and the second motor generator is configured to carry out stationary power generation using at least part of power of the engine when the vehicle is parked.

19 Claims, 8 Drawing Sheets

(51) Int. Cl.
| | |
|---|---|
| *B60K 6/36* | (2007.10) |
| *B60K 6/38* | (2007.10) |
| *B60K 6/547* | (2007.10) |
| *B60L 1/00* | (2006.01) |
| *F16H 3/00* | (2006.01) |
| *F16H 3/08* | (2006.01) |
| *F16H 3/093* | (2006.01) |

(52) U.S. Cl.
CPC .............. *B60K 6/547* (2013.01); *B60L 1/006* (2013.01); *F16H 3/006* (2013.01); *F16H 3/08* (2013.01); *F16H 3/093* (2013.01); *B60Y 2200/92* (2013.01); *F16H 2003/0822* (2013.01); *F16H 2003/0931* (2013.01); *F16H 2200/0052* (2013.01); *F16H 2200/0056* (2013.01)

(58) Field of Classification Search
CPC ....... B60K 6/24; B60L 1/006; B60Y 2200/92; B60Y 2300/91; F16H 3/006; F16H 3/08; F16H 3/093; F16H 2003/0822; F16H 2003/0931; F16H 2200/0052; F16H 2200/0056; Y02T 10/62
See application file for complete search history.

(56) References Cited

U.S. PATENT DOCUMENTS

| | | | | |
|---|---|---|---|---|
| 6,549,840 | B1* | 4/2003 | Mikami | B60W 10/06 701/69 |
| 6,615,940 | B2* | 9/2003 | Morisawa | B60K 6/543 180/65.1 |
| 6,634,247 | B2* | 10/2003 | Pels | B60W 10/02 74/329 |
| 6,691,809 | B2* | 2/2004 | Hata | B60W 10/26 180/65.225 |
| 7,108,626 | B2* | 9/2006 | Friedmann | B60K 6/40 475/8 |
| 7,282,008 | B2* | 10/2007 | Oshidari | B60K 6/365 477/4 |
| 7,395,889 | B2* | 7/2008 | Sugiyama | B60L 50/61 180/65.285 |
| 7,490,685 | B2* | 2/2009 | Aoki | B60W 10/08 180/65.28 |
| 7,575,529 | B2* | 8/2009 | Holmes | B60K 6/48 475/5 |
| 8,297,141 | B2* | 10/2012 | Cimatti | F16H 61/0028 74/330 |
| 8,424,622 | B2* | 4/2013 | Ideshio | B60L 50/61 180/65.225 |
| 8,622,862 | B2* | 1/2014 | Koyama | B60L 15/20 475/5 |
| 8,684,885 | B2* | 4/2014 | Ichikawa | B60K 6/543 477/6 |
| 8,757,306 | B2* | 6/2014 | Kobayashi | B60W 20/40 180/65.265 |
| 8,915,822 | B2* | 12/2014 | Ichikawa | B60K 17/08 477/6 |
| 8,979,694 | B2* | 3/2015 | Holmes | B60W 20/30 475/5 |
| 9,008,927 | B2* | 4/2015 | Iwase | B60W 30/20 701/54 |
| 9,067,584 | B2* | 6/2015 | Yaguchi | B60W 50/08 |
| 9,150,092 | B2* | 10/2015 | Murakami | H02K 16/02 |
| 9,340,100 | B2* | 5/2016 | Park | B60K 6/442 |
| 9,381,801 | B2* | 7/2016 | Sugimura | B60K 6/54 |
| 9,469,294 | B2* | 10/2016 | Takahashi | B60K 6/547 |
| 9,527,375 | B2* | 12/2016 | Clark | B60W 20/16 |
| 9,568,082 | B2* | 2/2017 | Yang | B60K 6/387 |
| 9,604,529 | B2* | 3/2017 | Choi | B60K 6/365 |
| 9,669,819 | B2* | 6/2017 | Saito | B60K 6/445 |
| 9,765,869 | B2* | 9/2017 | Holmes | F16H 37/021 |
| 10,065,640 | B2* | 9/2018 | Yang | B60W 10/06 |
| 10,066,718 | B2* | 9/2018 | Imamura | B60K 17/02 |
| 10,144,406 | B2* | 12/2018 | Ishikawa | B60K 6/445 |
| 10,166,966 | B2* | 1/2019 | Dufford | B60W 10/06 |
| 10,214,092 | B2* | 2/2019 | Yang | B60K 6/445 |
| 10,214,196 | B2* | 2/2019 | Hotta | B60W 50/0097 |
| 10,293,811 | B2* | 5/2019 | Tsukizaki | B60K 6/38 |
| 10,434,862 | B2* | 10/2019 | Hwang | B60K 6/365 |
| 10,760,662 | B2* | 9/2020 | Lian | B60K 6/48 |
| 10,781,890 | B2* | 9/2020 | Lian | B60K 7/0007 |
| 10,788,110 | B2* | 9/2020 | Katsura | F16H 37/022 |
| 10,800,248 | B2* | 10/2020 | Ruan | F16H 3/093 |
| 10,850,599 | B2* | 12/2020 | Lian | B60K 6/36 |
| 10,913,341 | B2* | 2/2021 | Cho | B60K 6/547 |
| 2002/0045507 | A1* | 4/2002 | Bowen | F16H 3/727 475/5 |
| 2002/0088291 | A1* | 7/2002 | Bowen | B60W 10/113 74/339 |
| 2002/0177504 | A1* | 11/2002 | Pels | B60K 6/387 477/3 |
| 2003/0075368 | A1* | 4/2003 | Takaoka | B60K 6/46 180/65.235 |
| 2006/0289212 | A1* | 12/2006 | Haruhisa | B60W 20/13 180/65.235 |
| 2007/0119678 | A1* | 5/2007 | Houle | F16D 27/12 192/69.8 |
| 2011/0160015 | A1* | 6/2011 | Ren | B60K 6/547 475/5 |
| 2011/0233020 | A1* | 9/2011 | Tajima | B60W 20/15 192/48.8 |
| 2014/0123806 | A1* | 5/2014 | Lee | B60K 6/547 74/661 |
| 2014/0257653 | A1* | 9/2014 | Sato | B60W 20/10 701/55 |
| 2014/0296027 | A1* | 10/2014 | Takahashi | B60W 30/18109 477/5 |
| 2015/0006065 | A1* | 1/2015 | Yamamoto | F02D 29/02 701/113 |
| 2016/0101680 | A1* | 4/2016 | Ahn | B60K 6/365 475/5 |
| 2016/0207392 | A1* | 7/2016 | Zhang | B60K 6/36 |
| 2016/0280057 | A1* | 9/2016 | Kang | B60K 6/387 |
| 2017/0259809 | A1* | 9/2017 | Sakamoto | B60W 20/20 |
| 2018/0208044 | A1* | 7/2018 | Imamura | B60W 10/08 |
| 2018/0257478 | A1* | 9/2018 | Haka | B60K 6/445 |
| 2018/0264927 | A1* | 9/2018 | Komada | B60K 6/365 |
| 2018/0372200 | A1* | 12/2018 | Kumar | B60K 6/36 |
| 2019/0291568 | A1* | 9/2019 | Lian | B60K 6/42 |
| 2019/0308497 | A1* | 10/2019 | Lian | F16H 37/046 |
| 2020/0023733 | A1* | 1/2020 | Lian | B60K 6/547 |
| 2021/0023931 | A1* | 1/2021 | Hwang | B60K 6/365 |

FOREIGN PATENT DOCUMENTS

| | | |
|---|---|---|
| CN | 204095490 U | 1/2015 |
| CN | 104608612 A | 5/2015 |
| CN | 104608621 A | 5/2015 |
| CN | 104773062 A | 7/2015 |
| CN | 104773063 A | 7/2015 |

(56) References Cited

FOREIGN PATENT DOCUMENTS

| | | |
|---|---|---|
| CN | 104786816 A | 7/2015 |
| CN | 105459788 A | 4/2016 |
| JP | 2003301897 A | 10/2003 |

* cited by examiner

POWER-DRIVEN SYSTEM FOR VEHICLE AND VEHICLE

CROSS-REFERENCE TO RELATED APPLICATIONS

This application is a national phase entry under 35 U.S.C. § 371 of International Application No. PCT/CN2017/095899, filed on Aug. 3, 2017, which claims a priority to and benefits of Chinese Patent Application Serial No. 201610858511.6, filed with the State Intellectual Property Office of P. R. China on Sep. 28, 2016, the entire content of all of which is incorporated herein by reference.

FIELD

The present disclosure relates to the technical field of vehicles, in particular to a power-drive system for a vehicle and a vehicle having the power-drive system.

BACKGROUND

With constant consumption of energy, the development and utilization of new-energy vehicles have gradually become a trend. As one type of the new-energy vehicles, hybrid vehicles driven by engines and/or motors have multiple modes and can improve the drive efficiency and the fuel economy.

However, in related technologies, the hybrid vehicles have a few drive modes, low drive efficiency, and low power generation efficiency under the stationary power generation condition.

SUMMARY

The present disclosure aims at resolving one of technical problems in related technologies at least to some extent. Accordingly, the embodiments of the present disclosure propose a power-drive system with rich drive modes, high drive efficiency and high stationary power generation efficiency for a vehicle.

The embodiments of the present disclosure further provide a vehicle.

A power-drive system for a vehicle according to the present disclosure, comprising: an engine; a plurality of input shafts, a gear-position driving gear being arranged on each input shaft; a plurality of output shafts, a gear-position driven gear being arranged on each output shaft, the gear-position driven gears correspondingly meshing with the gear-position driving gears, and the plurality of output shafts linking with a differential of the vehicle; a first clutch device, arranged between the engine and the plurality of input shafts, so that the engine selectively engages with at least one of the plurality of input shafts; a first motor generator, configured to link with the differential of the vehicle; and a second motor generator, the second motor generator and the engine being located on an input side of the first clutch device, the plurality of input shafts being located on an output side of the first clutch device, and the second motor generator being configured to carry out stationary power generation using at least part of power of the engine when the vehicle is parked.

The power-drive system for a vehicle according to an embodiment of the present disclosure is rich in drive modes and high in drive efficiency in a pure electric mode and a hybrid mode, thereby improving the dynamic property and economic efficiency of the vehicle. In addition, the stationary power generation efficiency is high when the vehicle is parked.

In some examples of the present disclosure, the first clutch device is a double clutch and has an input end, a first output end and a second output end, the input end selectively engaging with at least one of the first output end and the second output end.

In some examples of the present disclosure, the input end is provided with input end outer teeth, and the second motor generator links with the input end outer teeth.

In some examples of the present disclosure, the second motor generator is coaxially connected with the input end.

In some examples of the present disclosure, a second clutch device is arranged between the second motor generator and the engine.

In some examples of the present disclosure, the second clutch device is arranged inside a rotor of the second motor generator.

In some examples of the present disclosure, the engine, the second clutch device and the input end of the first clutch device are arranged coaxially.

In some examples of the present disclosure, the rated power of the first motor generator is greater than that of the second motor generator.

In some examples of the present disclosure, the rated power of the first motor generator is two or more times that of the second motor generator.

In some examples of the present disclosure, the second motor generator is located between the first clutch device and the engine.

In some examples of the present disclosure, a reversing output gear is freely sleeved on one of the plurality of output shafts, and a reversing synchronizer for engaging the reversing output gear with the one of the plurality of output shafts is further arranged on the output shaft; the power-drive system further includes a reversing shaft, a first reversing shaft gear and a second reversing shaft gear are fixedly arranged on the reversing shaft, the first reversing shaft gear meshes with one gear-position driving gear, and the second reversing shaft gear meshes with the reversing output gear.

In some examples of the present disclosure, a reversing output gear is freely sleeved on one of the plurality of output shafts, a reversing synchronizer for engaging the reversing output gear with the one of the plurality of output shafts is further arranged on the output shaft, and the reversing output gear links with one gear-position driving gear through an intermediate idle gear.

In some examples of the present disclosure, a reversing output gear is freely sleeved on one of the plurality of output shafts, a reversing synchronizer for engaging the reversing output gear with the one of the plurality of output shafts is further arranged on the output shaft, and the reversing output gear meshes with one gear-position driven gear.

In some examples of the present disclosure, the reversing output gear and one adjacent gear-position driven gear share the reversing synchronizer.

In some examples of the present disclosure, the plurality of input shafts comprises: a first input shaft and a second input shaft, the second input shaft is sleeved on the first input shaft, a first-gear driving gear, a third-gear driving gear and a fifth-gear driving gear are arranged on the first input shaft, and a second-gear driving gear and a fourth-sixth-gear driving gear are arranged on the second input shaft; the plurality of output shafts comprises: a first output shaft and a second output shaft, a first-gear driven gear, a second-gear driven gear, a third-gear driven gear and a fourth-gear driven gear are freely sleeved on the first output shaft, and a fifth-gear driven gear and a sixth-gear driven gear are freely sleeved on the second output shaft; a first-third-gear synchronizer is arranged between the first-gear driven gear and the third-gear driven gear, a second-fourth-gear synchronizer is arranged between the second-gear driven gear and the fourth-gear driven gear, a fifth-gear synchronizer is arranged on one side of the fifth-gear driven gear, and a sixth-gear synchronizer is arranged on one side of the sixth-gear driven gear.

In some examples of the present disclosure, the reversing synchronizer is configured as the sixth-gear synchronizer.

In some examples of the present disclosure, the plurality of input shafts comprises: a first input shaft and a second input shaft, the second input shaft is sleeved on the first input shaft, a first-gear driving gear, a third-gear driving gear, a fifth-gear driving gear and a seventh-gear driving gear are arranged on the first input shaft, and a second-gear driving gear and a fourth-sixth-gear driving gear are arranged on the second input shaft; the plurality of output shafts comprises: a first output shaft and a second output shaft; a second-gear driven gear, a third-gear driven gear, a sixth-gear driven gear and a seventh-gear driven gear are freely sleeved on the first output shaft, and a first-gear driven gear, a fourth-gear driven gear and a fifth-gear driven gear are freely sleeved on the second output shaft; a second-sixth-gear synchronizer is arranged between the second-gear driven gear and the sixth-gear driven gear, a third-seventh-gear synchronizer is arranged between the third-gear driven gear and the seventh-gear driven gear, a first-fifth-gear synchronizer is arranged between the first-gear driven gear and the fifth-gear driven gear, and a fourth-gear synchronizer is arranged on one side of the fourth-gear driven gear.

In some examples of the present disclosure, the reversing synchronizer is configured as the fourth-gear synchronizer.

In some examples of the present disclosure, the first motor generator is coaxially connected with one of the plurality of output shafts; or the first motor generator links with a main reducer driven gear of the vehicle by using a gear transmission assembly.

A vehicle according to an embodiment of the present disclosure comprises the power-drive system according to the above embodiments.

The vehicle according to the embodiment of the present disclosure has the same advantages as the power-drive system for a vehicle according to the above embodiments of the present disclosure, and details are omitted herein.

DETAILED DESCRIPTION

Figure 1:
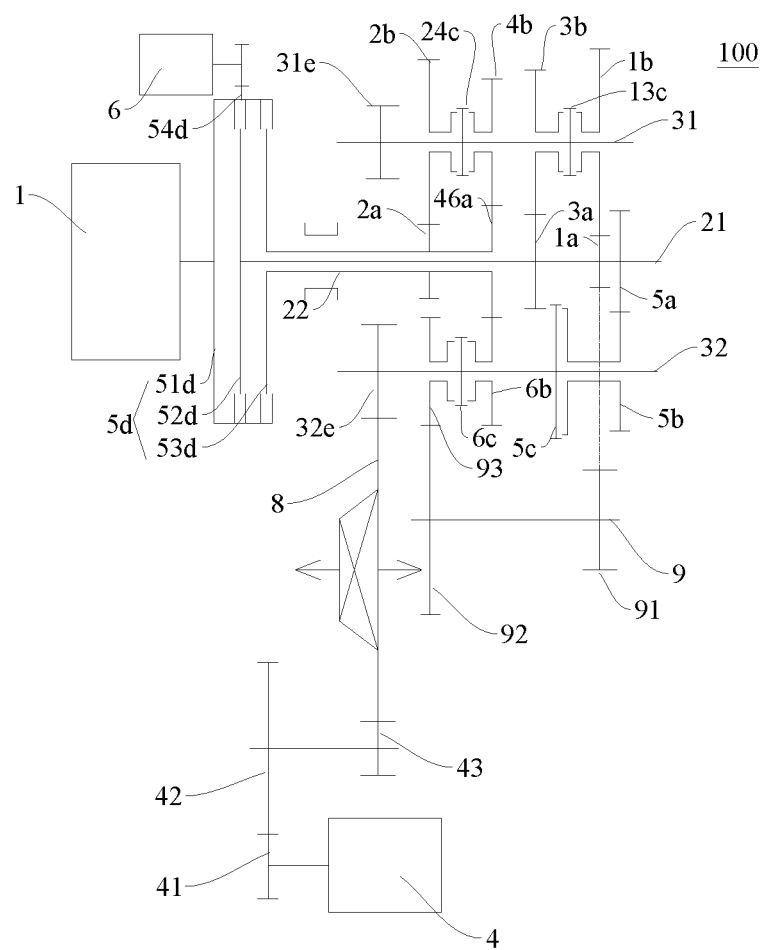
FIG. 1 is a schematic diagram of a power-drive system according to a first embodiment of the present disclosure.

The embodiments of the present disclosure are described in detail below. Examples of the embodiments are illustrated in the accompanying drawings. The embodiments described below with reference to the accompanying drawings are exemplary, and are used for explaining rather than limiting the present disclosure.

The following describes a power-drive system 100 according to an embodiment of the present disclosure in detail below with reference to the accompanying drawings. The power-drive system 100 can be applied to a vehicle 1000, e.g., a hybrid vehicle 1000.

The power-drive system 100 according to an embodiment of the present disclosure may include: an engine 1, a plurality of input shafts, a plurality of output shafts, a first motor generator 4, and a second motor generator 6. Of course, the power-drive system 100 may also include other mechanical components, e.g., a first clutch device 5*d*, a second clutch device 7, and the like.

The engine 1 is configured to selectively engage with at least one of the plurality of input shafts. That is to say, when the engine 1 outputs power, the engine 1 can engage with one of the plurality of input shafts to transmit power. Of course, the engine 1 can also simultaneously engage with several of the plurality of input shafts to transmit power. A gear-position driving gear is arranged on each input shaft, a gear-position driven gear is arranged on each output shaft, and the gear-position driven gears correspondingly mesh with the gear-position driving gears. The power transmission between the input shafts and the output shafts can be realized by engagement between the gear-position driving gears and the gear-position driven gears. The output speeds of the output shafts can be changed by selecting gear-position driving gears and gear-position driven gears with different drive ratios.

Figure 2:
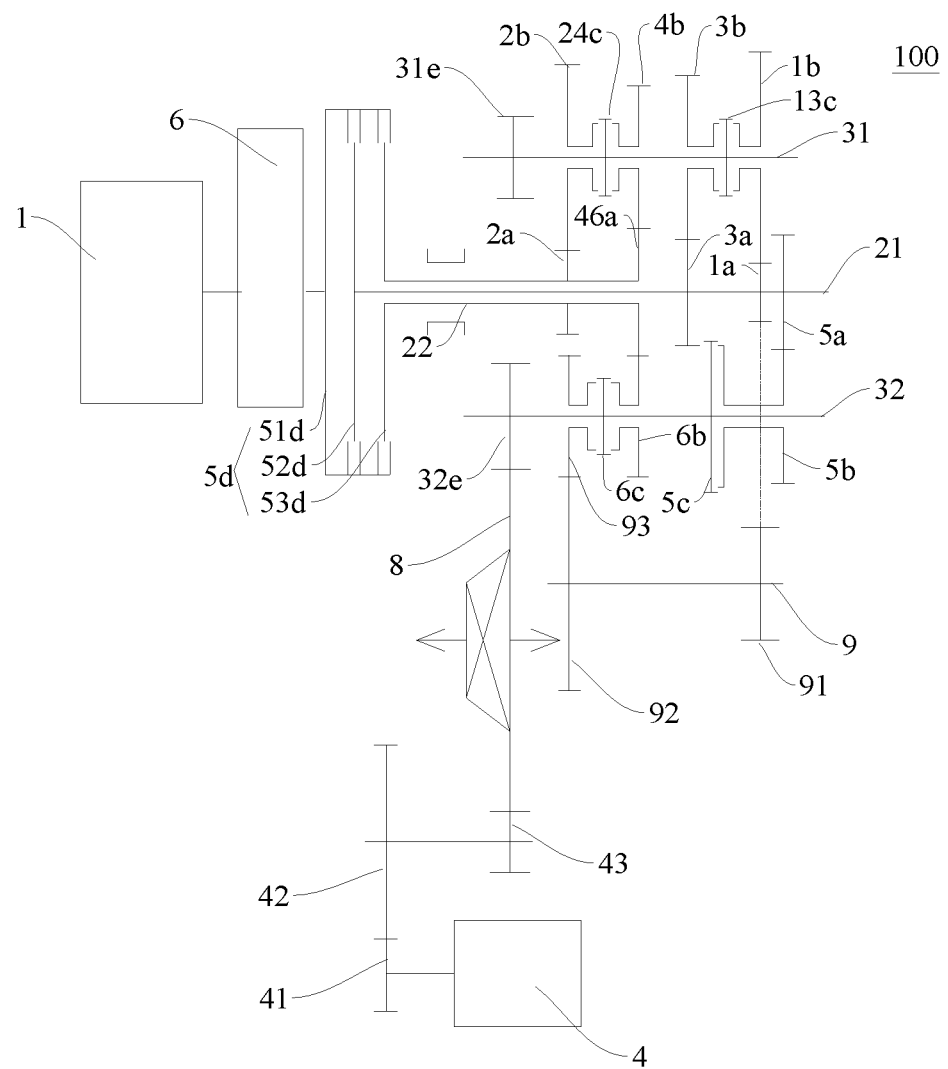
FIG. 2 is a schematic diagram of a power-drive system according to a second embodiment of the present disclosure.
Figure 3:
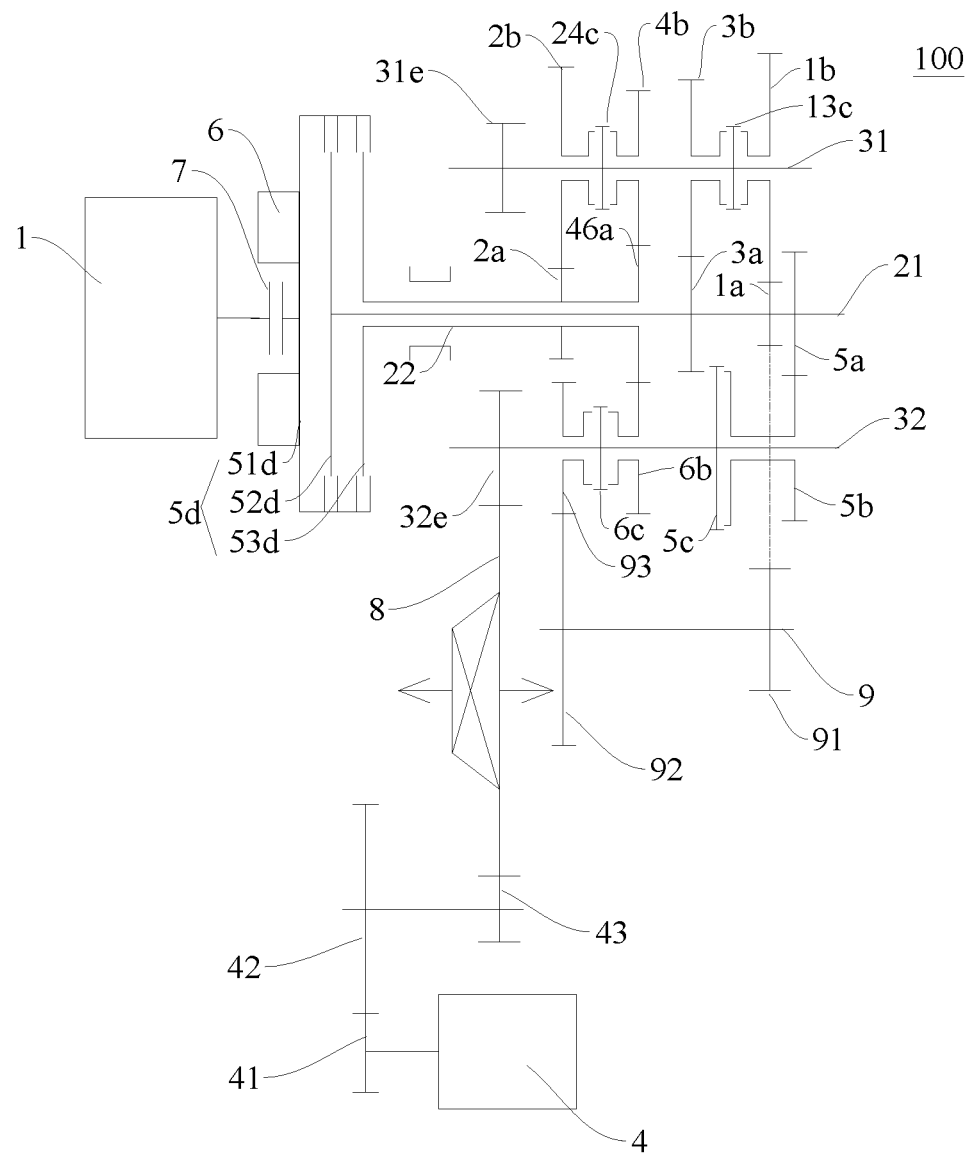
FIG. 3 is a schematic diagram of a power-drive system according to a third embodiment of the present disclosure.

The first clutch device 5*d* is arranged between the engine 1 and the plurality of input shafts, and the first clutch device 5*d* can allow the engine 1 to selectively engage with at least one of the plurality of input shafts. As shown in FIG. 1 to FIG. 3, the first clutch device 5*d* may be a double clutch, and has an input end 51*d*, a first output end 52*d* and a second output end 53*d*. The input end 51*d* can selectively engage with at least one of the first output end 52*d* and the second output end 53*d*. That is, the input end 51*d* may engage with the first output end 52*d*, or engage with the second output end 53*d*, or simultaneously engage with the first output end 52*d* and the second output end 53*d*.

For example, as shown in FIG. 1 to FIG. 3, the plurality of input shafts includes: a first input shaft 21 and a second input shaft 22, the first output end 52*d* is connected with the first input shaft 21, and the second output end 53*d* is connected with the second input shaft 22. The plurality of output shafts includes: a first output shaft 31 and a second output shaft 32.

In the embodiments of the present disclosure, the number and arrangement of gear positions are various, and the following describes two specific arrangements in detail as an example.

First gear-position arrangement: as shown in FIG. 1 to FIG. 6, a first-gear driving gear 1*a*, a third-gear driving gear 3a and a fifth-gear driving gear 5a are arranged on the first input shaft 21, and a second-gear driving gear 2a and a fourth-sixth-gear driving gear 46a are arranged on the second input shaft 22. The second input shaft 22 is sleeved on the first input shaft 21, thereby effectively shortening the axial length of the power-drive system 100, and reducing the space of the vehicle 1000 occupied by the power-drive system 100.

In the direction gradually away from the engine 1, the second-gear driving gear 2a, the fourth-sixth-gear driving gear 46a, the third-gear driving gear 3a, the first-gear driving gear 1a, and the fifth-gear driving gear 5a are arranged in sequence. By properly arranging the plurality of gear-position driving gears, the plurality of gear-position driven gears and the plurality of output shafts can be arranged reasonably, so that the power-drive system 100 is simple in structure and small in size.

A first-gear driven gear 1b, a second-gear driven gear 2b, a third-gear driven gear 3b and a fourth-gear driven gear 4b are freely sleeved on the first output shaft 31, and a fifth-gear driven gear 5b and a sixth-gear driven gear 6b are freely sleeved on the second output shaft 32. The first-gear driving gear 1a meshes with the first-gear driven gear 1b, the second-gear driving gear 2a meshes with the second-gear driven gear 2b, the third-gear driving gear 3a meshes with the third-gear driven gear 3b, the fourth-sixth-gear driving gear 46a meshes with the fourth-gear driven gear 4b, the fifth-gear driving gear 5a meshes with the fifth-gear driven gear 5b, and the fourth-sixth-gear driving gear 46a meshes with the sixth-gear driven gear 6b.

A first-third-gear synchronizer 13c is arranged between the first-gear driven gear 1b and the third-gear driven gear 3b, and the first-third-gear synchronizer 13c can be used for synchronizing the first-gear driven gear 1b with the first output shaft 31, and synchronizing the third-gear driven gear 3b with the first output shaft 31.

A second-fourth-gear synchronizer 24c is arranged between the second-gear driven gear 2b and the fourth-gear driven gear 4b, and the second-fourth-gear synchronizer 24c can be used for synchronizing the second-gear driven gear 2b with the first output shaft 31, and synchronizing the fourth-gear driven gear 4b and the first output shaft 31.

A fifth-gear synchronizer 5c is arranged on one side of the fifth-gear driven gear 5b, and the fifth-gear synchronizer 5c can be used for synchronizing the fifth-gear driven gear 5b with the second output shaft 32.

A sixth-gear synchronizer 6c is arranged on one side of the sixth-gear driven gear 6b, and the sixth-gear synchronizer 6c can be used for synchronizing the sixth-gear driven gear 6b with the second output shaft 32.

Figure 7:
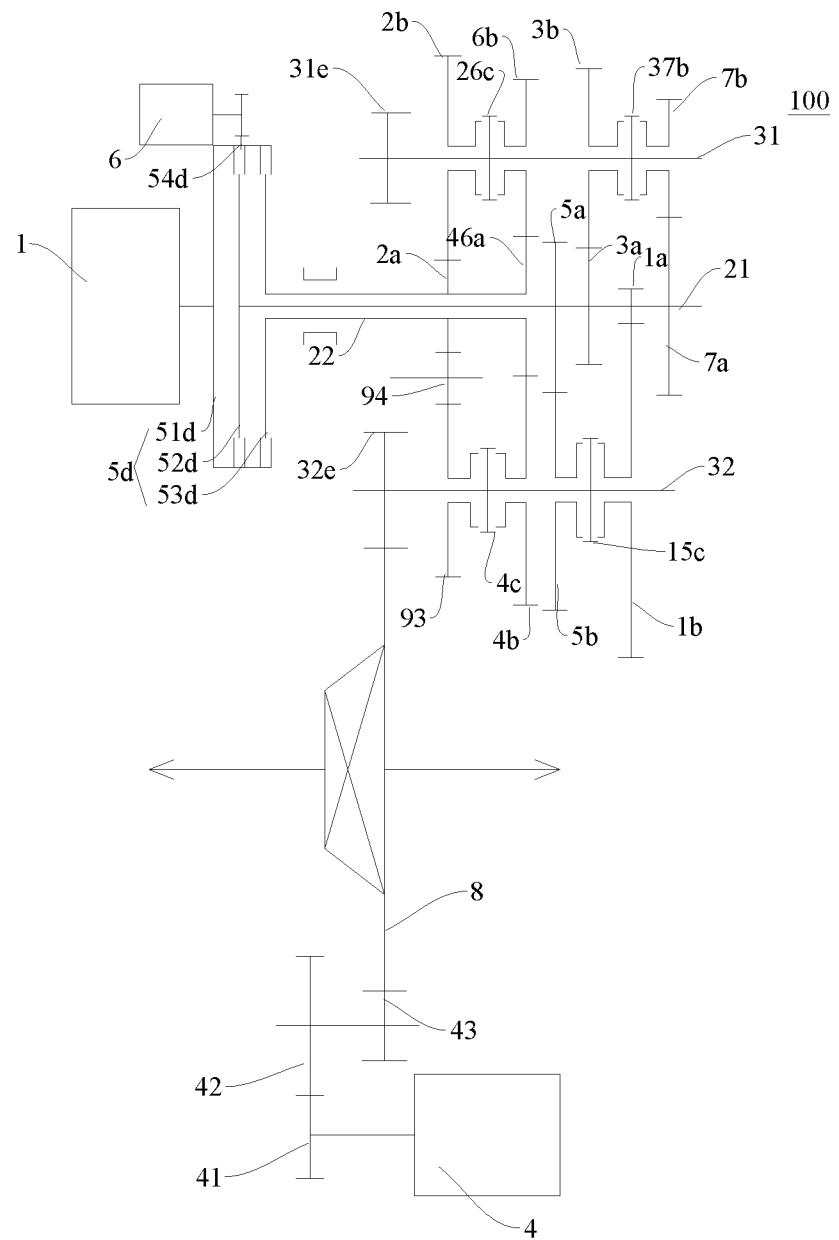
FIG. 7 is a schematic diagram of a power-drive system according to a seventh embodiment of the present disclosure.
Figure 8:
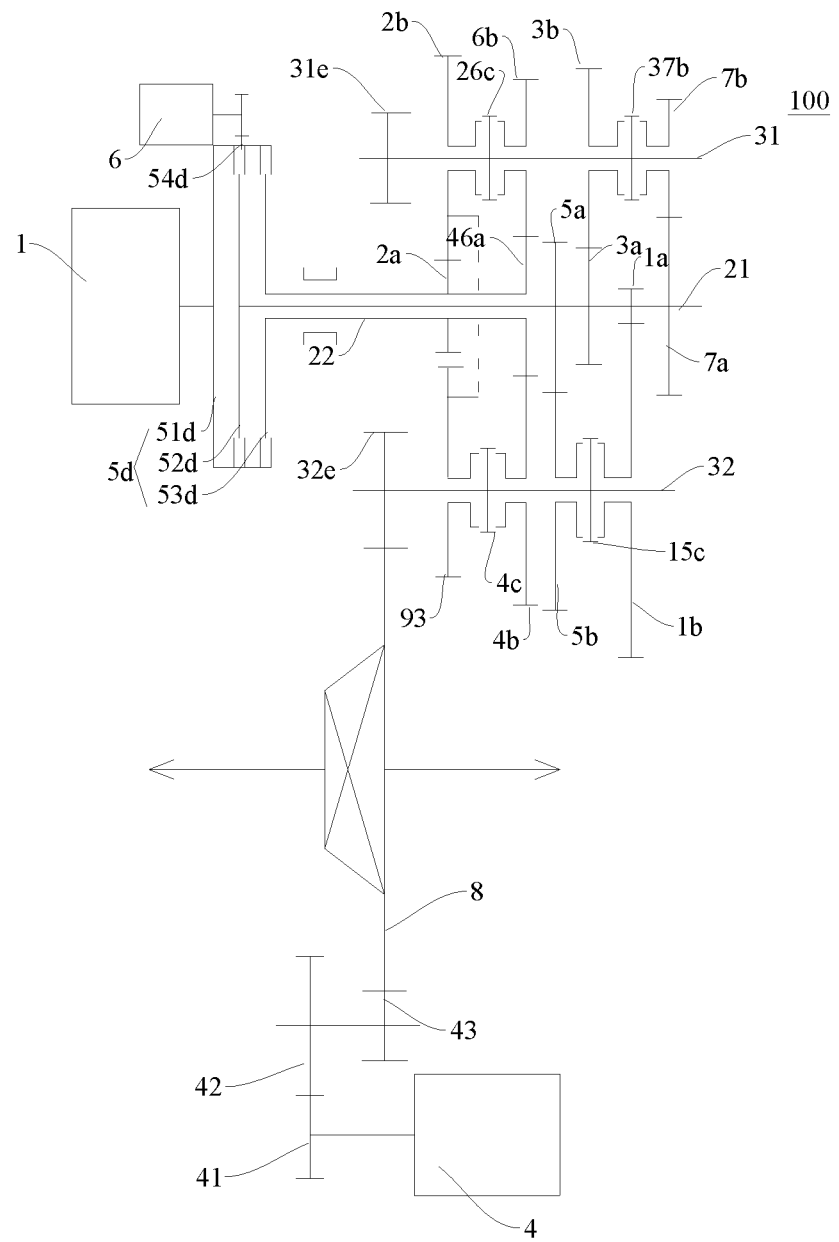
FIG. 8 is a schematic diagram of a power-drive system according to an eighth embodiment of the present disclosure.

Second gear-position arrangement: as shown in FIG. 7 and FIG. 8, a first-gear driving gear 1a, a third-gear driving gear 3a, a fifth-gear driving gear 5a and a seventh-gear driving gear 7a are arranged on the first input shaft 21, and a second-gear driving gear 2a and a fourth-sixth-gear driving gear 46a are arranged on the second input shaft 22. The second input shaft 22 is sleeved on the first input shaft 21, thereby effectively shortening the axial length of the power-drive system 100, and reducing the space of the vehicle 1000 occupied by the power-drive system 100.

In the direction gradually away from the engine 1, the second-gear driving gear 2a, the fourth-sixth-gear driving gear 46a, the fifth-gear driving gear 5a, the third-gear driving gear 3a, the first-gear driving gear 1a and the seventh-gear driving gear 7a are arranged in sequence. By properly arranging the plurality of gear-position driving gears, the plurality of gear-position driven gears and the plurality of output shafts can be arranged in a way such that the power-drive system 100 is simple in structure and small in size.

A second-gear driven gear 2b, a third-gear driven gear 3b, a sixth-gear driven gear 6b and a seventh-gear driven gear 7b are freely sleeved on the first output shaft 31, and a first-gear driven gear 1b, a fourth-gear driven gear 4b and a fifth-gear driven gear 5b are freely sleeved on the second output shaft 32.

The first-gear driving gear 1a meshes with the first-gear driven gear 1b, the second-gear driving gear 2a meshes with the second-gear driven gear 2b, the third-gear driving gear 3a meshes with the third-gear driven gear 3b, the fourth-sixth-gear driving gear 46a meshes with the fourth-gear driven gear 4b, the fifth-gear driving gear 5a meshes with the fifth-gear driven gear 5b, the fourth-sixth-gear driving gear 46a meshes with the sixth-gear driven gear 6b, and the seventh-gear driving gear 7a meshes with the seventh-gear driven gear 7b.

A second-sixth-gear synchronizer 26c is arranged between the second-gear driven gear 2b and the sixth-gear driven gear 6b, and the second-sixth-gear synchronizer 26c can be used for engaging the second-gear driven gear 2b with the first output shaft 31, and engaging the sixth-gear driven gear 6b with the first output shaft 31.

A third-seventh-gear synchronizer 37c is arranged between the third-gear driven gear 3b and the seventh-gear driven gear 7b, and the third-seventh-gear synchronizer 37c can be used for engaging the third-gear driven gear 3b with the first output shaft 31, and engaging the seventh-gear driven gear 7b with the first output shaft 31.

A first-fifth-gear synchronizer 15c is arranged between the first-gear driven gear 1b and the fifth-gear driven gear 5b, and the first-fifth-gear synchronizer 15c can be used for engaging the first-gear driven gear 1b with the second output shaft 32, and engaging the fifth-gear driven gear 5b with the second output shaft 32.

A fourth-gear synchronizer 4c is arranged on one side of the fourth-gear driven gear 4b. The fourth-gear synchronizer 4c is used for engaging the fourth-gear driven gear 4b with the second output shaft 32.

Moreover, in the embodiments of the present disclosure, the plurality of output shafts all link with a differential of the vehicle 1000.

It should be noted that the above-mentioned "link" can be understood as associated movement of a plurality of components (e.g., two). Taking the linkage of two components as an example, when one of the components moves, the other component also moves.

For example, in some embodiments of the present disclosure, the linkage of a gear and a shaft can be understood as, when the gear rotates, the shaft linked with the gear also rotates, or when the shaft rotates, the gear linked with the shaft also rotates.

For another example, the linkage of shafts can be understood as, when one of the shafts rotates, the other shaft linked with the shaft also rotates.

For another example, the linkage of gears can be understood as, when one of the gears rotates, the other gear linked with the gear also rotates.

In the following description of the present disclosure, the "link" is understood as the same, unless otherwise specified.

The first motor generator 4 is configured to link with the differential of the vehicle 1000 in various manners, which are described in detail herein with reference to the accompanying drawings. In addition, a main reducer driven gear 8 is arranged at the differential.

In the embodiment shown in FIG. 1 to FIG. 3, the first motor generator 4 links with the main reducer driven gear 8 of the differential by using a gear transmission assembly. The gear transmission assembly may include: a first drive gear 41, a second drive gear 42 and a third drive gear 43. The first drive gear 41 is fixedly connected to a motor shaft of the first motor generator 4, the second drive gear 42 meshes with the first drive gear 41, the second drive gear 42 is coaxially fixed with the third drive gear 43, and power transmission exists between the third drive gear 43 and the differential. Thus, the transmission path between the first motor generator 4 and the differential is short, and the transmission efficiency is high.

In some other embodiments of the present disclosure, the first motor generator 4 may also link with one output shaft.

Figure 4:
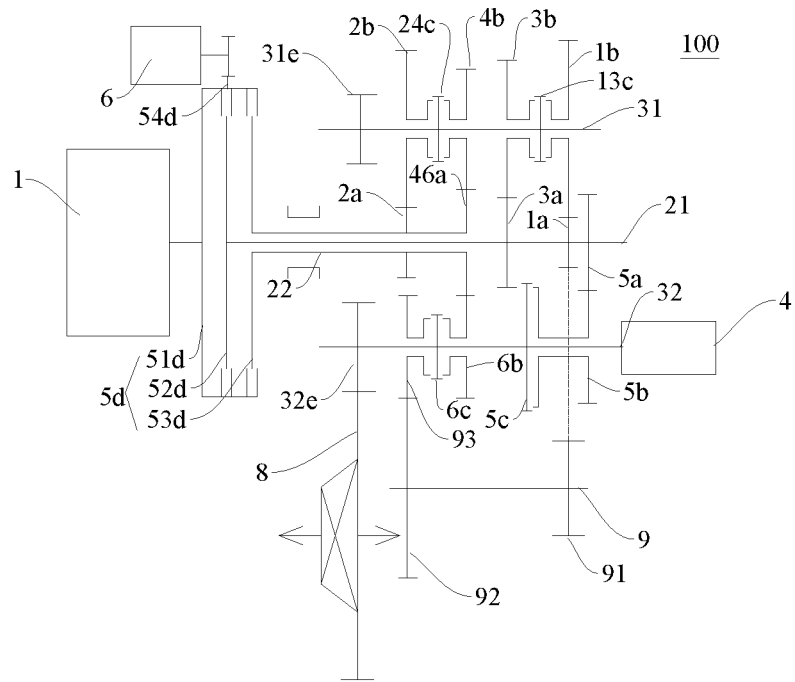
FIG. 4 is a schematic diagram of a power-drive system according to a fourth embodiment of the present disclosure.

As shown in FIG. 4, the first motor generator 4 is coaxially connected with the second output shaft 32, and the power of the first motor generator 4 can be directly transmitted to the differential through the second output shaft 32, so that the transmission path between the first motor generator 4 and the differential is short, and the transmission efficiency is high.

Figure 5:
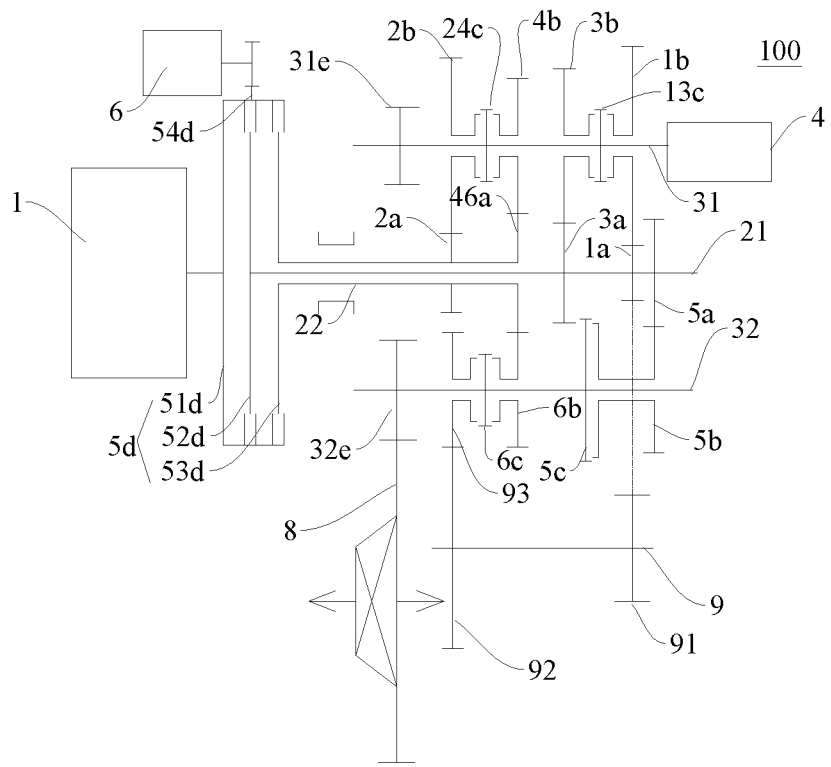
FIG. 5 is a schematic diagram of a power-drive system according to a fifth embodiment of the present disclosure.

As shown in FIG. 5, the first motor generator 4 is coaxially connected with the first output shaft 31, and the power of the first motor generator 4 can be directly transmitted to the differential through the first output shaft 31, so that the transmission path between the first motor generator 4 and the differential is short, and the transmission efficiency is high.

In the embodiments of the present disclosure, the second motor generator 6 and the engine 1 are located on an input side of the first clutch device 5d, and the second motor generator 6 may be located between the first clutch device 5d and the engine 1. The second motor generator 6 is arranged on the input side of the first clutch device 5d, so that the axial length of the power-drive system 100 can be effectively shortened, and the second motor generator 6 can be arranged rationally to improve the structural compactness of the power-drive system 100.

The second motor generator 6 can be a motor generator having small capacity and small size, thereby meeting the miniaturization requirement of a transmission. The internal structure of the transmission has strict requirements on the space, and the second motor generator 6 having small size occupies a small space of the transmission, so that the second motor generator 6 can be prevented from interfering with other components (e.g., the first clutch device 5d), and the transmission is reasonable and compact in structure.

The plurality of input shafts is located on the output side of the first clutch device 5d. The second motor generator 6 is configured to carry out stationary power generation using at least part of the power of the engine 1 when the vehicle 1000 is parked. When the vehicle 1000 is parked, at least part of the power of the engine 1 can be directly transferred to the second motor generator 6 for power generation, or at least part of the power of the engine 1 can be indirectly transmitted to the second motor generator 6 for power generation through the input end 51d.

The following describes the connection and arrangement relationship between the engine 1 and the second motor generator 6 with reference to the accompanying drawings.

As shown in FIG. 1, input end outer teeth 54d may be arranged on the input end 51d, and the second motor generator 6 links with the input end outer teeth 54d. Thus, the power of the engine 1 can be transmitted to the second motor generator 6 through the input end 51d and the input end outer teeth 54d, and the second motor generator 6 can be used as a generator for stationary power generation.

As shown in FIG. 2, the second motor generator 6 and the input end 51d can be coaxially connected. The second motor generator 6 may be arranged between the input end 51d and the engine 1, such that the power of the engine 1 necessarily passes through the second motor generator 6 when being transmitted towards the input end 51d, whereby the second motor generator 6 can be used as a generator for stationary power generation.

As shown in FIG. 3, a second clutch device 7 is arranged between the second motor generator 6 and the engine 1. The second clutch device 7 is a single clutch, and the second clutch device 7 can control the engagement and disengagement between the engine 1 and the second motor generator 6, and control the engagement and disengagement between the engine 1 and the input end 51d. By providing the second clutch device 7, the stationary power generation state of the second motor generator 6 can be reasonably controlled, so that the power-drive system 100 is simple in structure and reliable in drive mode conversion.

In some embodiments of the present disclosure, the second clutch device 7 is arranged inside a rotor of the second motor generator 6. In this way, the axial length of the power-drive system 100 can be better shortened, so that the size of the power-drive system 100 can be reduced, and the arrangement flexibility of the power-drive system 100 on the vehicle 1000 can be improved. In addition, the second motor generator 6 can also be used as a starter.

In some embodiments of the present disclosure, the engine 1, the second clutch device 7, and the input end 51d of the first clutch device 5d are coaxially arranged. Thus, the power-drive system 100 is compact in structure and small in size.

It should be noted that, for the power-drive system 100 according to the above three embodiments, the second motor generator 6 is located between the engine 1 and the first clutch device 5d in the axial direction, so that the axial length of the power-drive system 100 can be effectively shortened, the second motor generator 6 can be reasonably arranged, and the structural compactness of the power-drive system 100 can be improved.

The first motor generator 4 is used as a main driving motor of the power-drive system 100, so the capacity and size of the first motor generator 4 are large. However, the first motor generator 4 can drive the differential, thereby minimizing the size of the power-drive system 100, and avoiding the interference between the first motor generator 4 and the second motor generator 6.

In an embodiment of the present disclosure, the rated power of the first motor generator 4 is greater than that of the second motor generator 6. The second motor generator 6 can be a motor generator having small size and small rated power, so that the power-drive system 100 is simple in structure and small in size. In addition, during the stationary power generation, the transmission path between the second motor generator 6 and the engine 1 is short, the power generation efficiency is high, and a part of the power of the engine 1 can be efficiently converted into electric energy. Furthermore, the peak power of the first motor generator 4 is also greater than that of the second motor generator 6.

In some embodiments of the present disclosure, the rated power of the first motor generator 4 is two or more times that of the second motor generator 6. The peak power of the first motor generator 4 is two or more times that of the second motor generator 6. For example, the rated power of the first motor generator 4 may be 60 kW, the rated power of the second motor generator 6 may be 24 kW, the peak power of the first motor generator 4 may be 120 kW, and the peak power of the second motor generator 6 may be 44 kW.

In the embodiments of the present disclosure, the power-drive system 100 has multiple reversing arrangements, which are described below in conjunction with the accompanying drawings.

As shown in FIG. 1 to FIG. 5, the power-drive system 100 further includes a reversing shaft 9 on which a first reversing shaft gear 91 and a second reversing shaft gear 92 can be fixedly arranged. A reversing output gear 93 is freely sleeved on one of the plurality of output shafts, and a reversing synchronizer for engaging the reversing output gear 93 with the output shaft is further arranged on the output shaft. Specifically, the output shaft is the second output shaft 32.

The first reversing shaft gear 91 meshes with one gear-position driving gear, and the second reversing shaft gear 92 meshes with the reversing output gear 93. In some embodiments of the present disclosure, the one gear-position driving gear may be the first-gear driving gear 1a. Thus, the power transmitted to the first-gear driving gear 1a can be transmitted to the second output shaft 32 through the first reversing shaft gear 91, the reversing shaft 9, the second reversing shaft gear 92 and the reversing output gear 93 in sequence, and the second output shaft 32 further transmits the power to the differential and the wheels to drive the vehicle 1000 to reversing, thereby achieving the reversing operation of the vehicle 1000.

Figure 6:
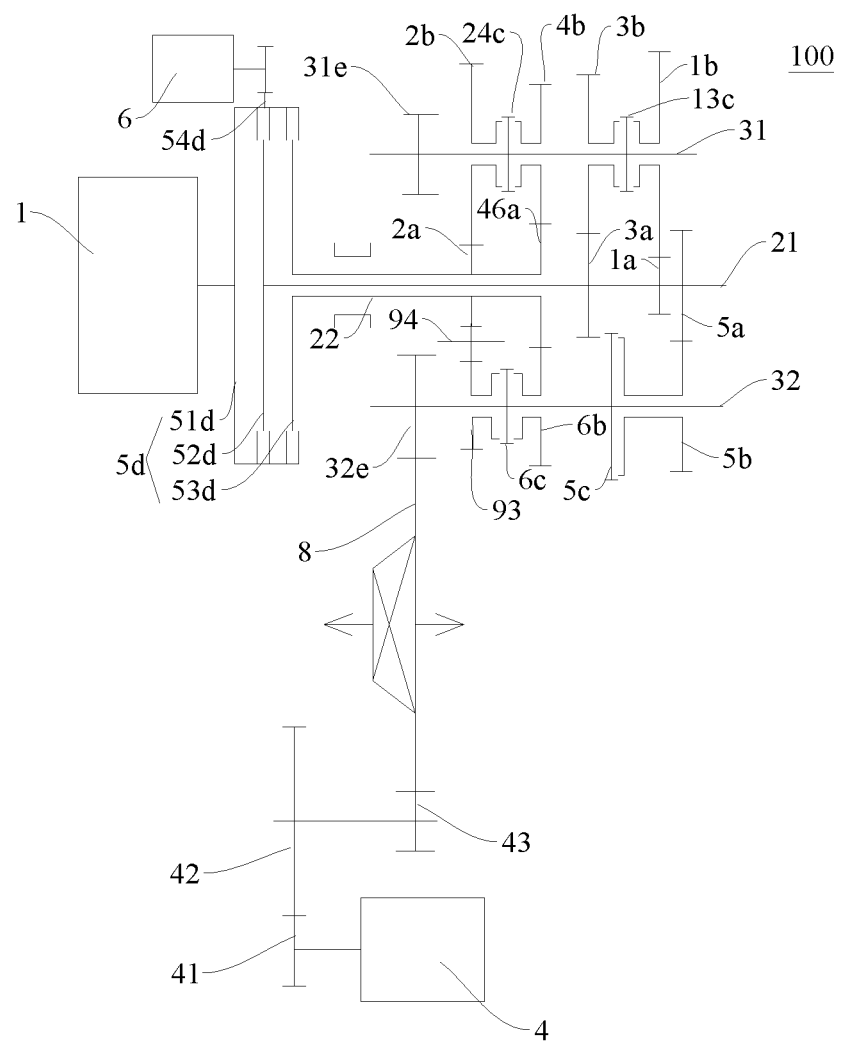
FIG. 6 is a schematic diagram of a power-drive system according to a sixth embodiment of the present disclosure.

As shown in FIG. 6 and FIG. 7, a reversing output gear 93 is freely sleeved on one of the plurality of output shafts, and a reversing synchronizer for engaging the reversing output gear 93 with the output shaft is further arranged on the output shaft. Specifically, the output shaft is the second output shaft 32.

The reversing output gear 93 links with one gear-position driving gear by using an intermediate idle gear 94. The intermediate idle gear 94 can ensure that the reversing output gear 93 and the one gear-position driving gear rotate in the same direction, thereby achieving the reversing operation of the vehicle 1000. The intermediate idle gear 94 is a single gear, and is directly meshed between the one gear-position driving gear and the reversing output gear 93. Specifically, the one gear-position driving gear is the second-gear driving gear 2a.

As shown in FIG. 8, a reversing output gear 93 is freely sleeved on one of the plurality of output shafts, and a reversing synchronizer for engaging the reversing output gear 93 with the output shaft is further arranged on the output shaft. Specifically, the output shaft is the second output shaft 32.

The reversing output gear 93 meshes with one gear-position driven gear. Thus, the reversing output gear 93 can rotate in the same direction as the gear-position driving gear corresponding to the gear-position driven gear, and the reversing operation of the vehicle 1000 is achieved. Specifically, the gear-position driven gear is the second-gear driven gear 2b.

In the above various embodiments, the reversing output gear 93 and one adjacent gear-position driven gear can share a reversing synchronizer, which can reduce the number of synchronizers arranged on the second output shaft 32, thereby effectively simplifying the structure of the power-drive system 100.

In the power-drive system 100 shown in FIG. 1 to FIG. 6, the gear-position driven gear adjacent to the reversing output gear 93 is the sixth-gear driven gear 6b, that is, the reversing synchronizer is the sixth-gear synchronizer 6c. In the power-drive system 100 shown in FIG. 7 and FIG. 8, the gear-position driven gear adjacent to the reversing output gear 93 is the fourth-gear driven gear 4b, that is, the reversing synchronizer is the fourth-gear synchronizer 4c.

The following describes the operating modes of the power-drive system 100 for the vehicle 1000 according to an embodiment of the present disclosure in detail with reference to the accompanying drawings. The difference between the power-drive system 100 shown in FIG. 2 and FIG. 3 and the power-drive system 100 shown in FIG. 1 is mainly embodied in the arrangement of the second motor generator 6, but the arrangement of the second motor generator 6 has little influence on the operating mode. The difference between the power-drive system 100 shown in FIG. 4 and FIG. 5 and the power-drive system 100 shown in FIG. 1 is mainly embodied in the arrangement of the first motor generator 4. The difference between the power-drive system 100 shown in FIG. 6 to FIG. 8 and the power-drive system 100 shown in FIG. 1 is mainly embodied in the reversing arrangement. Therefore, the operating mode of the power-drive system 100 shown in FIG. 2 to FIG. 8 is substantially the same as the operating mode of the power-drive system 100 shown in FIG. 1. The following describes the operating mode of the power-drive system 100 shown in FIG. 1 in detail as an example.

Pure engine mode: the power of the engine 1 is transmitted to the first input shaft 21 and/or the second input shaft 22 through the first clutch device 5d, then transmitted to the first output shaft 31 or the second output shaft 32 through a corresponding gear-position gear pair, and finally transmitted to the differential to drive the wheels to rotate. The gear-position gear pair includes a gear-position driving gear and a gear-position driven gear corresponding to each other. In this mode, the input end 51d of the first clutch device 5d selectively engages with at least one of the two output ends.

Pure electric mode: when the first motor generator 4 is used as a motor, the power of the first motor generator 4 is transmitted to the differential to drive wheels to rotate.

Hybrid mode: a combination of the pure engine mode and the pure electric mode, the power of the engine 1 and the power of the first motor generator 4 are coupled at the main reducer driven gear 8.

Stationary power generation mode: the power of the engine 1 is all transmitted to the second motor generator 6 through the input end 51d of the first clutch device 5d, and the second motor generator 6 functions as a generator for stationary power generation.

First driving power generation mode: a part of the power of the engine 1 is transmitted to the differential through the first clutch device 5d, the input shaft and the output shaft to drive the wheels to rotate, and the other part of the power of the engine 1 is transmitted to the second motor generator 6 through the input end 51d of the first clutch device 5d for power generation.

Second driving power generation mode: the power of the engine 1 is transmitted to the differential through the first clutch device 5d, the input shaft and the output shaft to drive the wheels to rotate, and the main reducer driven gear 8 can transmit a part of the power to the first motor generator 4 for power generation.

It should be noted that those skilled in the art could carry out reasonable inference and combination according to the descriptions and the accompanying drawings after reading the present patent application, and the obtained embodiments all fall into the protection scope of the present patent application.

For example, the arrangement of the second motor generator 6 in the power-drive system 100 shown in FIG. 4 can be replaced with the arrangement of the second motor generator 6 shown in FIG. 2 and FIG. 3.

For another example, the arrangement of the second motor generator 6 in the power-drive system 100 shown in FIG. 5 can be replaced with the arrangement of the second motor generator 6 shown in FIG. 2 and FIG. 3.

For another example, the reversing arrangement in the power-drive system 100 shown in FIG. 1 to FIG. 6 can be replaced with the reversing arrangement in FIG. 7 or FIG. 8.

Figure 9:
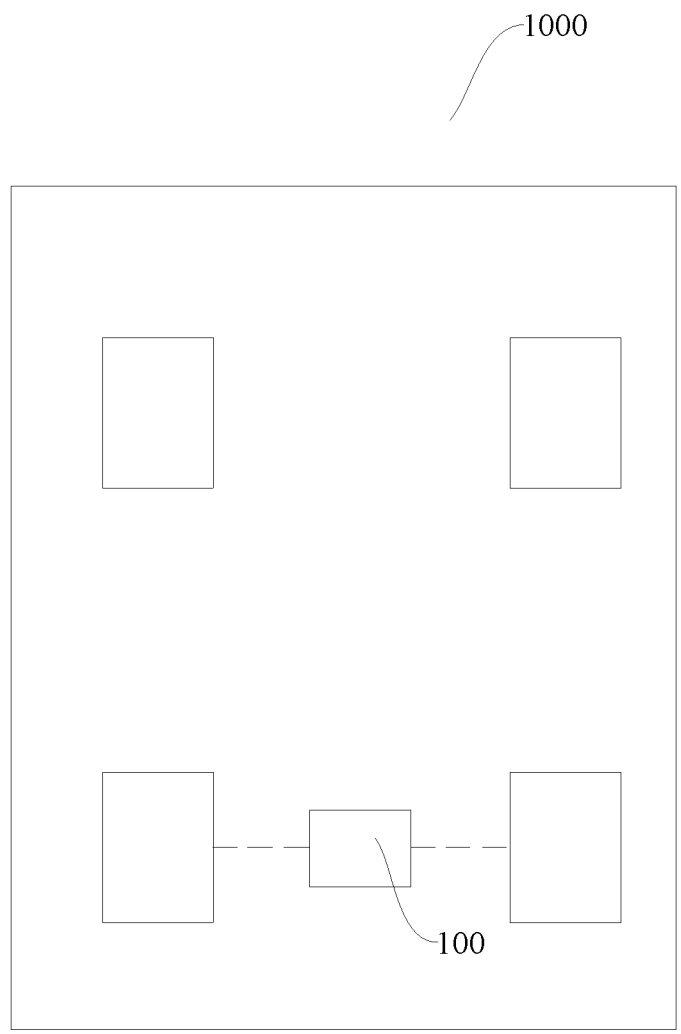
FIG. 9 is a structure diagram of a vehicle according to an embodiment of the present disclosure.

As shown in FIG. 9, the vehicle 1000 according to an embodiment of the present disclosure includes the power-drive system 100 for a vehicle 1000 according to the above embodiments.

In the descriptions of this specification, descriptions such as reference terms "an embodiment", "some embodiments", "example", "specific example", or "some examples" intend to indicate that specific features, structures, materials, or characteristics described with reference to embodiments or examples are included in at least one embodiment or example of this disclosure. In this specification, schematic descriptions of the foregoing terms do not need to aim at a same embodiment or example. Besides, the specific features, the structures, the materials or the characteristics that are described may be combined in a proper manner in any one or more embodiments or examples. In addition, in a case that is not mutually contradictory, persons skilled in the art can combine or group different embodiments or examples that are described in this specification and features of the different embodiments or examples.

Although the embodiments of the present disclosure are shown and described above, it may be understood that the foregoing embodiments are examples, and cannot be understood as limitations to the present disclosure. A person of ordinary skill in the art may make changes, modifications, replacements, and variations to the foregoing embodiments without departing from the scope of the present disclosure.

What is claimed is:

1. A power-drive system for a vehicle, comprising:
   an engine;
   a plurality of input shafts, a gear-position driving gear being arranged on each input shaft;
   a plurality of output shafts, a gear-position driven gear being arranged on each output shaft, the gear-position driven gears correspondingly meshing with the gear-position driving gears, and the plurality of output shafts linking with a differential of the vehicle;
   a first clutch device, arranged between the engine and the plurality of input shafts, such that the engine selectively engages with at least one of the plurality of input shafts;
   a first motor generator, configured to link with the differential of the vehicle; and
   a second motor generator, the second motor generator and the engine being located on an input side of the first clutch device, the plurality of input shafts being located on an output side of the first clutch device, and the second motor generator being configured to carry out stationary power generation using at least part of power of the engine when the vehicle is parked,
   wherein the first motor generator is coaxially connected with one of the plurality of output shafts, such that power of the first motor generator is directly transmitted to the differential through the one of the plurality of output shafts.

2. The power-drive system for a vehicle according to claim 1, wherein the first clutch device is a double clutch and has an input end, a first output end and a second output end, the input end selectively engaging with at least one of the first output end and the second output end.

3. The power-drive system for a vehicle according to claim 2, wherein the input end is provided with input end outer teeth, and the second motor generator links with the input end outer teeth.

4. The power-drive system for a vehicle according to claim 2, wherein the second motor generator is coaxially connected with the input end.

5. The power-drive system for a vehicle according to claim 2, wherein a second clutch device is arranged between the second motor generator and the engine.

6. The power-drive system for a vehicle according to claim 5, wherein the second clutch device is arranged inside a rotor of the second motor generator.

7. The power-drive system for a vehicle according to claim 5, wherein the engine, the second clutch device and the input end of the first clutch device are arranged coaxially.

8. The power-drive system for a vehicle according to claim 1, wherein the rated power of the first motor generator is greater than that of the second motor generator.

9. The power-drive system for a vehicle according to claim 8, wherein the rated power of the first motor generator is two or more times that of the second motor generator.

10. The power-drive system for a vehicle according to claim 1, wherein the second motor generator is located between the first clutch device and the engine.

11. The power-drive system for a vehicle according to claim 1, wherein a reversing output gear is freely sleeved on one of the plurality of output shafts, and a reversing synchronizer for engaging the reversing output gear with the one of the plurality of output shafts is further arranged on the output shaft;
    the power-drive system further includes a reversing shaft, a first reversing shaft gear and a second reversing shaft gear being fixedly arranged on the reversing shaft, the first reversing shaft gear meshing with one gear-position driving gear, and the second reversing shaft gear meshing with the reversing output gear.

12. The power-drive system for a vehicle according to claim 1, wherein a reversing output gear is freely sleeved on one of the plurality of output shafts, a reversing synchronizer for engaging the reversing output gear with the one of the plurality of output shafts is further arranged on the output shaft, and the reversing output gear links with one gear-position driving gear through an intermediate idle gear.

13. The power-drive system for a vehicle according to claim 1, wherein a reversing output gear is freely sleeved on one of the plurality of output shafts, a reversing synchronizer for engaging the reversing output gear with the one of the plurality of output shafts is further arranged on the output shaft, and the reversing output gear meshes with one gear-position driven gear.

14. The power-drive system for a vehicle according to claim 11, wherein the reversing output gear and one adjacent gear-position driven gear share the reversing synchronizer.

15. The power-drive system for a vehicle according to claim 14, wherein
    the plurality of input shafts comprises: a first input shaft and a second input shaft, the second input shaft being sleeved on the first input shaft, a first-gear driving gear, a third-gear driving gear and a fifth-gear driving gear being arranged on the first input shaft, and a second-gear driving gear and a fourth-sixth-gear driving gear being arranged on the second input shaft;

the plurality of output shafts comprises: a first output shaft and a second output shaft, a first-gear driven gear, a second-gear driven gear, a third-gear driven gear and a fourth-gear driven gear being freely sleeved on the first output shaft, and a fifth-gear driven gear and a sixth-gear driven gear being freely sleeved on the second output shaft;

a first-third-gear synchronizer is arranged between the first-gear driven gear and the third-gear driven gear, a second-fourth-gear synchronizer is arranged between the second-gear driven gear and the fourth-gear driven gear, a fifth-gear synchronizer is arranged on one side of the fifth-gear driven gear, and a sixth-gear synchronizer is arranged on one side of the sixth-gear driven gear.

16. The power-drive system for a vehicle according to claim 15, wherein the reversing synchronizer is configured as the sixth-gear synchronizer.

17. The power-drive system for a vehicle according to claim 14, wherein the plurality of input shafts comprises: a first input shaft and a second input shaft, the second input shaft being sleeved on the first input shaft, a first-gear driving gear, a third-gear driving gear, a fifth-gear driving gear and a seventh-gear driving gear being arranged on the first input shaft, and a second-gear driving gear and a fourth-sixth-gear driving gear being arranged on the second input shaft;

the plurality of output shafts comprises: a first output shaft and a second output shaft; a second-gear driven gear, a third-gear driven gear, a sixth-gear driven gear and a seventh-gear driven gear being freely sleeved on the first output shaft, and a first-gear driven gear, a fourth-gear driven gear and a fifth-gear driven gear being freely sleeved on the second output shaft;

a second-sixth-gear synchronizer is arranged between the second-gear driven gear and the sixth-gear driven gear, a third-seventh-gear synchronizer is arranged between the third-gear driven gear and the seventh-gear driven gear, a first-fifth-gear synchronizer is arranged between the first-gear driven gear and the fifth-gear driven gear, and a fourth-gear synchronizer is arranged on one side of the fourth-gear driven gear.

18. The power-drive system for a vehicle according to claim 17, wherein the reversing synchronizer is configured as the fourth-gear synchronizer.

19. A vehicle, comprising:
a power-drive system comprising:
an engine;
a plurality of input shafts, a gear-position driving gear being arranged on each input shaft;
a plurality of output shafts, a gear-position driven gear being arranged on each output shaft, the gear-position driven gears correspondingly meshing with the gear-position driving gears, and the plurality of output shafts linking with a differential of the vehicle;
a first clutch device, arranged between the engine and the plurality of input shafts, such that the engine selectively engages with at least one of the plurality of input shafts;
a first motor generator, configured to link with the differential of the vehicle; and
a second motor generator, the second motor generator and the engine being located on an input side of the first clutch device, the plurality of input shafts being located on an output side of the first clutch device, and the second motor generator being configured to carry out stationary power generation using at least part of power of the engine when the vehicle is parked,
wherein the first motor generator is coaxially connected with one of the plurality of output shafts, such that power of the first motor generator is directly transmitted to the differential through the one of the plurality of output shafts.

* * * * *